US011892654B2

(12) United States Patent
Hsu et al.

(10) Patent No.: US 11,892,654 B2
(45) Date of Patent: Feb. 6, 2024

(54) PASSIVE SPECKLE-SUPPRESSING DIFFUSERS AND ASSOCIATED METHODS AND ILLUMINATORS

(71) Applicant: OmniVision Technologies, Inc., Santa Clara, CA (US)

(72) Inventors: Shih-Hsin Hsu, Taipei (TW); Jau-Jan Deng, Taipei (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 492 days.

(21) Appl. No.: 16/594,534

(22) Filed: Oct. 7, 2019

(65) Prior Publication Data

US 2021/0103159 A1 Apr. 8, 2021

(51) Int. Cl.
*G02B 27/48* (2006.01)
*G02B 5/02* (2006.01)
(Continued)

(52) U.S. Cl.
CPC ........... *G02B 27/48* (2013.01); *G02B 3/0037* (2013.01); *G02B 5/0278* (2013.01); *G02B 5/0294* (2013.01); *G02B 5/1871* (2013.01)

(58) Field of Classification Search
CPC ........ G02B 27/48; G02B 27/42; G02B 27/10; G02B 3/00; G02B 3/0037; G02B 3/0062; G02B 3/0012; G02B 3/005; G02B 3/0056; G02B 5/02; G02B 5/18; G02B 5/0278; G02B 5/0294; G02B 5/0268;
(Continued)

(56) References Cited

U.S. PATENT DOCUMENTS 6,147,801 A * 11/2000 Goldenberg ......... G03B 21/625
359/456
6,859,326 B2  2/2005 Sales
(Continued)

OTHER PUBLICATIONS

Ruffato G. et al., Design, fabrication and characterization of Computer Generated Holograms for anticounterfeiting applications using OAM beams as light decoders, Scientific Reports | (2017) 7:18011, pp. 1-13.

*Primary Examiner* — Jie Lei
(74) *Attorney, Agent, or Firm* — COZEN O'CONNOR (57) ABSTRACT

A passive speckle-suppressing diffuser includes a microlens array for diffusing a light field originating from one or more coherent light beams, and a diffractive optical element mounted in series with the microlens array and having a pixelated thickness distribution, characterized by a spatial variation across the diffractive optical element, to impose a spatially varying phase shift on the light field. The pixelated thickness distribution may be configured such that the spatially varying phase shift suppresses speckle of the light field while minimizing introduction of distinct diffraction structure. A method for passive speckle-suppressing diffusion a light field originating from one or more coherent light beams may include refracting the light field, through a microlens array, to diffuse the light field, and imposing a spatially varying phase shift on the light field to decohere the light field without introducing any first-order diffraction components deflected beyond angle spread introduced by the microlens array.

12 Claims, 7 Drawing Sheets

(51) Int. Cl.
*G02B 3/00* (2006.01)
*G02B 5/18* (2006.01)

(58) Field of Classification Search
CPC .. G02B 5/1871; G02B 26/0875; G03B 21/60; G03B 21/602; G03B 21/56
USPC ............... 359/575, 599, 558, 619, 629, 250, 359/452–457; 362/291, 335, 336, 355
See application file for complete search history.

(56) References Cited

U.S. PATENT DOCUMENTS

| | | |
|---|---|---|
| 7,813,054 B2 | 10/2010 | Sales |
| 8,130,433 B2 | 3/2012 | Gollier |
| 8,905,548 B2 | 12/2014 | Fan |
| 9,443,310 B2 | 9/2016 | Hudman et al. |
| 2004/0008399 A1* | 1/2004 | Trisnadi ................ G02B 27/48 359/279 |
| 2012/0080411 A1* | 4/2012 | Mizuyama ............ G02B 27/48 219/121.6 |

* cited by examiner

PASSIVE SPECKLE-SUPPRESSING DIFFUSERS AND ASSOCIATED METHODS AND ILLUMINATORS

BACKGROUND

Bright projection and illumination systems are used in a variety of applications, such as depth sensing, near-infrared imaging, lidar scanning, and cinema projectors. Light-emitting diodes (LEDs) are used in some of these applications. However, in some scenarios, the projection/illumination system must output more power than a single LED can produce. In some instances, this problem is overcome by implementing an array of LEDs. An optical diffuser may be positioned after the LED array to generate a reasonable uniform light output, as opposed to a light output with structure that resembles the positioning of LEDs in the array. The diffuser is, for example, a microlens array or a diffractive optical element.

Yet, in certain applications, an LED array is insufficient, and the energy requirements and heat output of an incandescent light bulb is undesirable. Other applications require higher efficiency, of converting electric power to light, than can be achieved with an LED or an incandescent light bulb. A coherent light source, such as a laser, offers a promising alternative as the light source in such applications.

When a coherent light source is used as an illuminator, speckle may be apparent on the object(s) illuminated. Speckle results from constructive and destructive interference between different portions of the coherent illumination that travelled along (slightly) different paths to the same location. In situations where speckle is unacceptable, speckle is typically reduced by actively moving a diffuser in the coherent light beam. The diffuser is moved fast enough that, on the timescale comprehensible to human vision, the speckle pattern is averaged out and instead appears at least nearly uniform. In one approach, an actively spinning diffractive optical element intersects the coherent light beam. In another approach, a vibrating microlens array intersects the coherent light beam.

SUMMARY

In an embodiment, a passive speckle-suppressing diffuser includes (a) a microlens array for diffusing a light field originating from one or more coherent light beams, and (b) a diffractive optical element mounted in series with the microlens array and having a pixelated thickness distribution, characterized by a spatial variation across the diffractive optical element, to impose a spatially varying phase shift on the light field. The pixelated thickness distribution has no periodic spatial pattern with period less than 80 micrometers, such that the spatially varying phase shift suppresses speckle of the light field while minimizing introduction of distinct diffraction structure.

In an embodiment, a method for passively diffusing one or more coherent light beams, while suppressing speckle, includes (a) refracting a light field originating from the one or more coherent light beams, through a microlens array, to diffuse the light field, and (b) imposing a spatially varying phase shift on the light field to decohere the light field without introducing any first-order diffraction components deflected beyond angle spread introduced by the microlens array in the step of refracting.

DESCRIPTION OF EXAMPLE EMBODIMENTS

Figure 1:
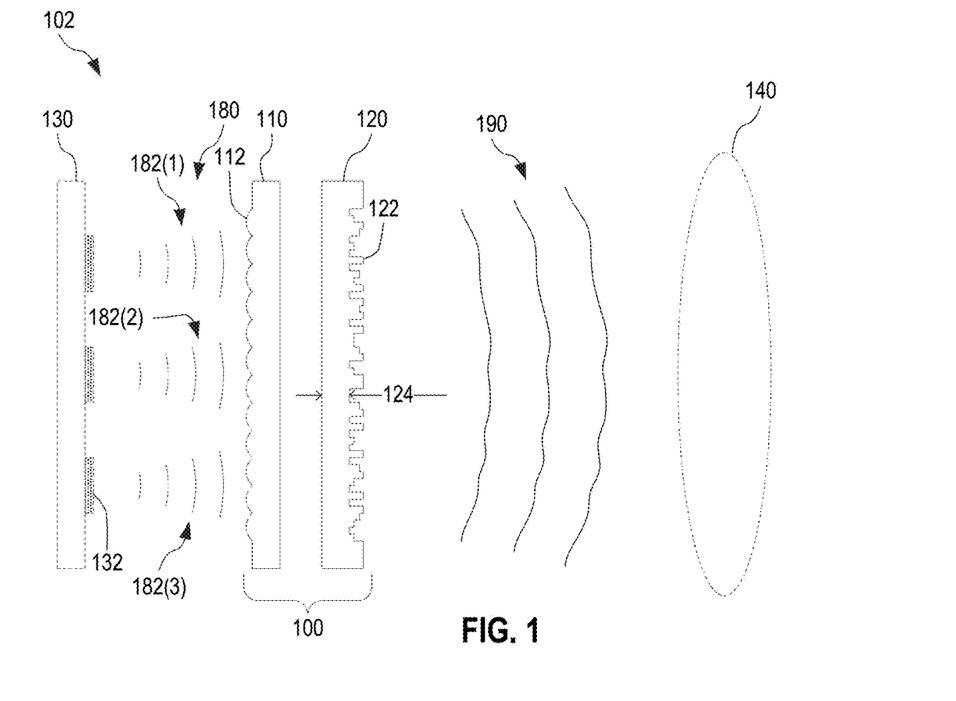
FIG. 1 illustrates, in an example use scenario, a passive, speckle-suppressing diffuser for diffusing a light field, according to an embodiment.
Figure 2:
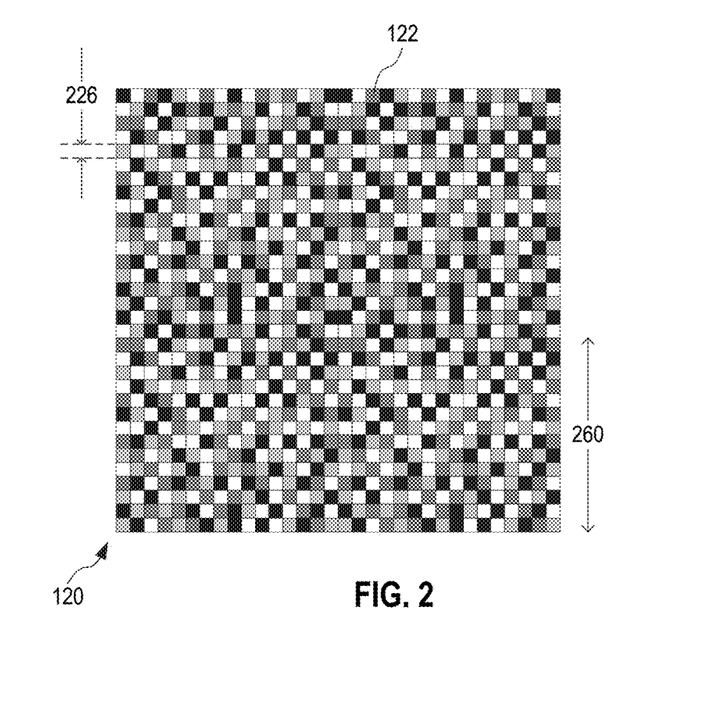
FIG. 2 is a plan view of a pixelated thickness distribution of a diffractive optical element (DOE) of the diffuser of FIG. 1, according to an embodiment.

FIGS. 1 and 2 illustrate one passive, speckle-suppressing diffuser 100 for diffusing a light field 180, so as to generate a diffused light field 190. Light field 180 includes one or more coherent light beams. FIG. 1 is a cross-sectional view of diffuser 100 for diffusing a light field 180 in an example use scenario. FIG. 2 is a plan view of a pixelated thickness distribution of a diffractive optical element (DOE) 120 of diffuser 100. FIGS. 1 and 2 are best viewed together in the following description.

In the scenario depicted in FIG. 1, diffuser 100 diffuses the output of a light source 130 having a plurality of emitters 132 each emitting a diverging, coherent light beam 182. Without departing from the scope hereof, diffuser 100 may instead operate on a single coherent light beam. Also without departing from the scope hereof, the one or more coherent light beams incident on diffuser 100 may be collimated or converging.

Herein, a "coherent" light beam may or may not be perfectly coherent. For example, a coherent light beam, as referred to herein, may have a non-zero spectral bandwidth. Diffuser 100 is useful when the degree of coherence of light field 180, incident thereon, is such that an interference pattern, e.g., speckle, would result if different portions of light field 180 were made to spatially coincide on an object. Typically, light field 180 includes one or more laser beams having identical wavelength or wavelength bands that spectrally overlap. Light source 130 is, for example, a laser diode array, such as an array of vertical-cavity surface-emitting lasers (VCSELs). The wavelength of light field 180 may be in the visible, ultraviolet, and/or infrared ranges, for example between 400 and 1600 nanometers.

Together, diffuser 100 and light source 130 form an illuminator 102 that outputs a diffused, speckle-suppressed light field. Illuminator 102 may be used in near-infrared imaging and/or three-dimensional depth sensing, for example.

Illuminator 102 may further include a lens 140. Lens 140 may collimate or focus diffused light field 190. It is understood that diffuser 100 may be provided as a standalone optical element, configured to be implemented in the path of a light field 180 generated by a third-party light source. In addition, DOE 120 may be provided as a standalone DOE for decohering a light field. In one scenario, such a DOE 120 is in conjunction with a third-party microlens array to diffuse a light field while suppressing speckle. In another scenario, such a DOE 120 is used to decohere a light field that is not subjected to diffusing by a microlens array.

Diffuser 100 includes a microlens array 110 and DOE 120. Microlens array 110 includes an array of microlenses 112 that cooperate to diffuse light field 180. DOE 120 has a pixelated thickness distribution. Each pixel 122 of the pixelated thickness distribution has a side length 226. Side length 226 is, for example, in the range between $0.1\lambda_1$ and $\lambda_2$, wherein $\lambda_1$ and $\lambda_2$ are minimum and maximum wavelengths, respectively, bounding the wavelength range of light field 180. In one example, diffuser 100 is configured to diffuse light field 180 having wavelength in the range between 400 and 1600 nanometers, and side length 226 is in the range between 0.04 microns and 1.6 microns. Without departing from the scope hereof, pixels 122 may be non-square. Each pixel 122 has a thickness 124. In certain embodiments, thickness 124 is constant within each pixel 122. Thickness 124 varies across DOE 120, such that DOE 120 imposes a spatially varying phase shift on light field 180. For example, the phase shift between two different portions of a light field 180, having wavelength 2, passing through two respective pixels 122 having two different respective thicknesses 124 will be $$\Delta\phi = \frac{2\pi}{\lambda}(n-1)d, \quad \text{(Eq. 1)}$$

wherein d is the thickness difference between the two pixels 122 and n is the refractive index of DOE 120. Typically, n is in the range between 1.0 and 3.0. Thus, by virtue of the spatially varying thickness 124, DOE 120 suppresses speckle in the diffused light field 190. In the absence of DOE 120, such speckle would likely result when microlens array 110 causes different spatial portions of light field 180 to interfere.

In contrast to a conventional speckle-suppressing element that relies on active movement to temporally average speckle, DOE 120 is passive. The spatially varying phase shift, imposed on light field 180 by the pixelated thickness distribution of DOE 120, decreases the coherence of diffused light field 190 such that speckle-producing interference is eliminated or significantly reduced. It is not necessary to move either one of DOE 120 and microlens array 110 relative to light field 180. Since no moving parts are required, diffuser 100 may be made more compact than diffuser requiring active movement. Diffuser 100 also does not suffer from the wear and tear associated with moving parts, and no power is required to operate diffuser 100. By virtue of requiring no power, being relatively robust, and requiring relatively little space, diffuser 100 is suitable for implementation in mobile and/or wearable devices. Furthermore, the manufacturing tolerance requirements to pixels 122 of DOE 120 are typically not very strict. Since, as discussed below in reference to FIG. 3, a high degree of randomness to the pixelated thickness distribution of DOE 120 is desirable, the performance of DOE 120 is relatively tolerant to inaccuracies in manufacturing.

Diffuser 100 is well-suited for cost-effective mass production, for example wafer-level manufacturing. Diffuser 100 may be composed of materials that can withstand high temperatures, such that diffuser 100 may be implemented in assemblies that require reflow-soldering.

In the embodiment depicted in FIGS. 1 and 2, thickness 124 attains four different values across DOE 120. Each of these four different values is represented by a different greyscale value in FIG. 2. However, in other embodiments, thickness 124 may attain three different values or more than four (e.g., eight) different values across DOE 120, or thickness 124 may be restricted to only two different values across DOE 120. A "multilevel" DOE 120 having more than two different values of thickness 124 may more efficiently decohere light field 180 since a multilevel DOE 120 will impose several different values of phase shift Δϕ. However, a "binary" DOE 120 having only two different values of thickness 124 may be simpler to manufacture. Even though a binary DOE 120 imposes only a single value of phase shift Δϕ, the spatial distribution across a binary DOE 120 of the two values of thickness 124 may be designed to sufficiently decohere light field 180.

FIG. 1 shows DOE 120 as being downstream from microlens array 110, such that microlens array 110 first diffuses light field 180, whereafter DOE 120 decoheres light field 180 to suppress speckle. Without departing from the scope hereof, DOE 120 may be upstream from microlens array 110, such that DOE 120 decoheres light field 180 before light field 180 is diffused by microlens array 110.

It is understood that DOE 120 may have more or fewer pixels 122 than depicted in FIGS. 1 and 2, for example between $10^3$ and $10^7$ pixels 122. It is further understood that (a) the array of pixels 122 may be non-square, e.g., round or shaped as an oblong rectangle, and (b) pixels 122 may be non-square, e.g., shaped as oblong rectangles. Similarly, it is understood that microlens array 110 may have more or fewer microlenses than indicated by the schematic in FIG. 1.

Figure 3:
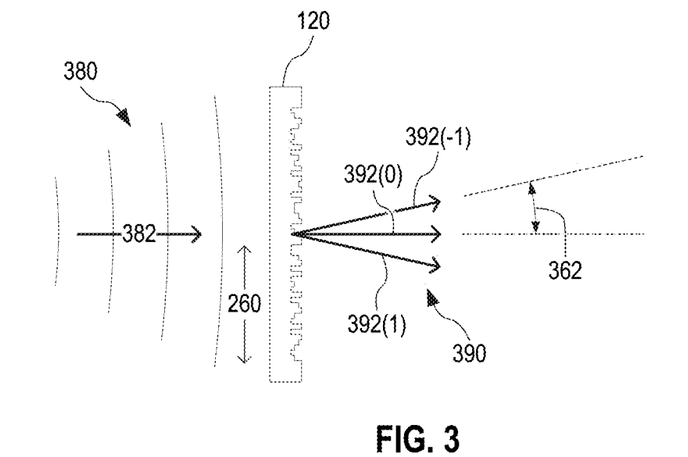
FIG. 3 is a diagram illustrating potential diffraction by a DOE, according to an embodiment.

FIG. 3 is a diagram illustrating potential diffraction by DOE 120. Not all embodiments of DOE 120 impose diffraction orders in the light field outputted by DOE 120. In most use scenarios, it would be undesirable for DOE 120 to impose distinct diffraction structure in diffused light field 190 because such diffraction structure would compromise the diffusing capability of diffuser 100. In order to prevent DOE 120 from introducing distinct diffraction structure in diffused light field 190, the pixelated thickness distribution of DOE 120 must exhibit a high degree of randomness.

In one embodiment, the pixelated thickness distribution of DOE 120 is entirely random with no periodic spatial structure. This embodiment of DOE 120 does not generate diffraction orders.

In certain other embodiments, the pixelated thickness distribution of DOE 120 does have a periodic spatial structure with period 260 (see FIGS. 2 and 3). Such embodiments of DOE 120 generate diffraction orders but, for sufficiently high values of period 260, the diffraction angles are (at least for first-order diffraction) negligible compared to the diffusing ability of microlens array 110. In FIG. 3, a light field 380 is incident on DOE 120 along a normal incidence direction 382. The diffraction grating formula states $m\lambda = D \sin \theta_m$, wherein $\theta_m$ is the diffraction angle of the m'th diffraction order and D is the period of the grating (e.g., period 260). Thus, the diffraction angle for the first diffraction order 392(1) and 392(−1), relative to the zeroth order 392(0) is $$\theta_1 = \sin^{-1}\left(\frac{\lambda}{D}\right). \tag{Eq. 2}$$

$\theta_1$ is shown in FIG. 3 as angle 362. It is understood that the diffraction angles shown in FIG. 3 are exaggerated for clarity. In one embodiment, period 260 is at least 100λ, such that the diffraction angle for the first diffraction order is no greater than $\theta_1 = \sin^{-1}(0.01) = 0.57°$. This angle is, for most useful embodiments negligible compared to the diffusing ability of microlens array 110 such that diffused light field 190 will be free of discernible diffraction structure.

In one embodiment, diffuser 100 is configured to diffuse an example of light field 180 having a wavelength λ less than 1600 nanometers. In this embodiment, the pixelated thickness distribution of DOE 120 may be characterized by having no periodic spatial structure with period less than 160 micrometers. In another embodiment, diffuser 100 is configured to diffuse an example of light field 180 having a wavelength λ less than 1200 nanometers. In this embodiment, the pixelated thickness distribution of DOE 120 may be characterized by having no periodic spatial structure with period less than 120 micrometers. In yet another embodiment, diffuser 100 is configured to diffuse an example of light field 180 having a wavelength λ less than 800 nanometers. In this embodiment, the pixelated thickness distribution of DOE 120 may be characterized by having no periodic spatial structure with period less than 80 micrometers.

Figure 4A:
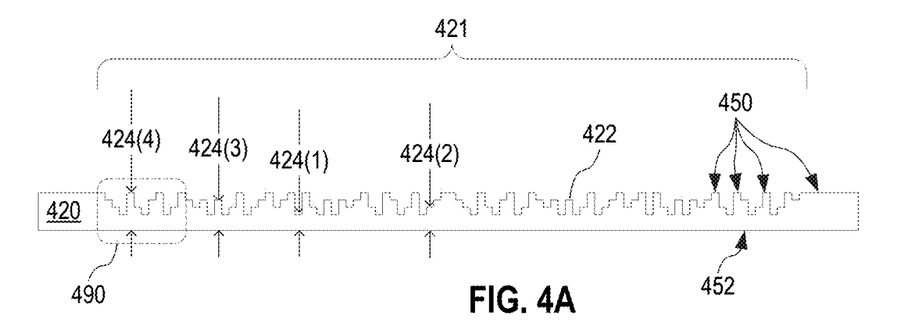
FIGS. 4A and 4B illustrate a multilevel DOE with a pixelated thickness distribution that attains more than two different values, according to an embodiment.
Figure 4B:
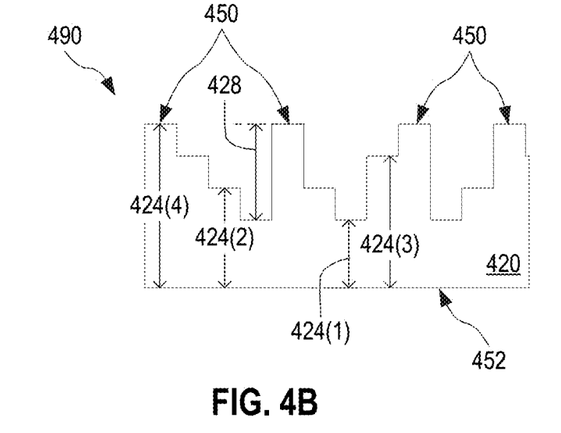

FIGS. 4A and 4B are cross-sectional views of one multilevel DOE 420 with a pixelated thickness distribution 421 that attains more than two different values. Multilevel DOE 420 is an embodiment of DOE 120. FIG. 4A shows a cross section of all of multilevel DOE 420, and FIG. 4B is a close-up view of the cross section of a portion 490 of multilevel DOE 420. FIGS. 4A and 4B are best viewed together.

Pixelated thickness distribution 421 is composed of an array of pixels 422 which are embodiments of pixels 122. Pixels 422 include pixels of K different thicknesses 424(k), wherein k=1, 2, ..., K, K is a positive integer greater than two, and thickness 424(k) is an increasing function of k. In the example depicted in FIGS. 4A and 4B, K=4. However, without departing from the scope hereof, K may equal three or be greater than four.

Multilevel DOE 420 has opposite-facing planar surfaces 450 and 452. Surface 452 is continuous across pixelated thickness distribution 421. Surface 450 is defined by pixels 422 having the maximum thickness 424(K). Such pixels 422 span between surfaces 450 and 452. Surface 450 is interrupted by pixels 422 of thicknesses 424(k) where k<K. Such pixels 422 are recessed from surface 450. The maximum recess depth $d_{max}$ (indicated in FIG. 4B as recess depth 428) is the difference between thicknesses 424(K) and 424(1). In an embodiment, the maximum recess depth $d_{max}$ satisfies the following conditions:

$$\frac{\lambda}{4(n-1)} < d_{max} < \frac{\lambda}{n-1}. \tag{Eq. 3}$$

As per Eq. 1, these conditions result in the maximum phase shift $\Delta\phi_{max}$ generated by multilevel DOE 420 being between π/2 and 2π. A maximum phase shift $\Delta\phi_{max}$ less than π/2 would generally fail to sufficiently decohere light field 180, whereas a maximum phase shift $\Delta\phi_{max}$ greater than 2π would be unnecessary and likely add manufacturing complexity.

It is understood that multilevel DOE 420 may have more or fewer pixels 422 than depicted in FIGS. 4A and 4B, for example between $10^3$ and $10^7$ pixels 422. It is further understood that (a) the array of pixels 422 may be non-square, e.g., round or shaped as an oblong rectangle, and (b) pixels 422 may be non-square, e.g., shaped as oblong rectangles.

Figures 5, 6A, 6B:
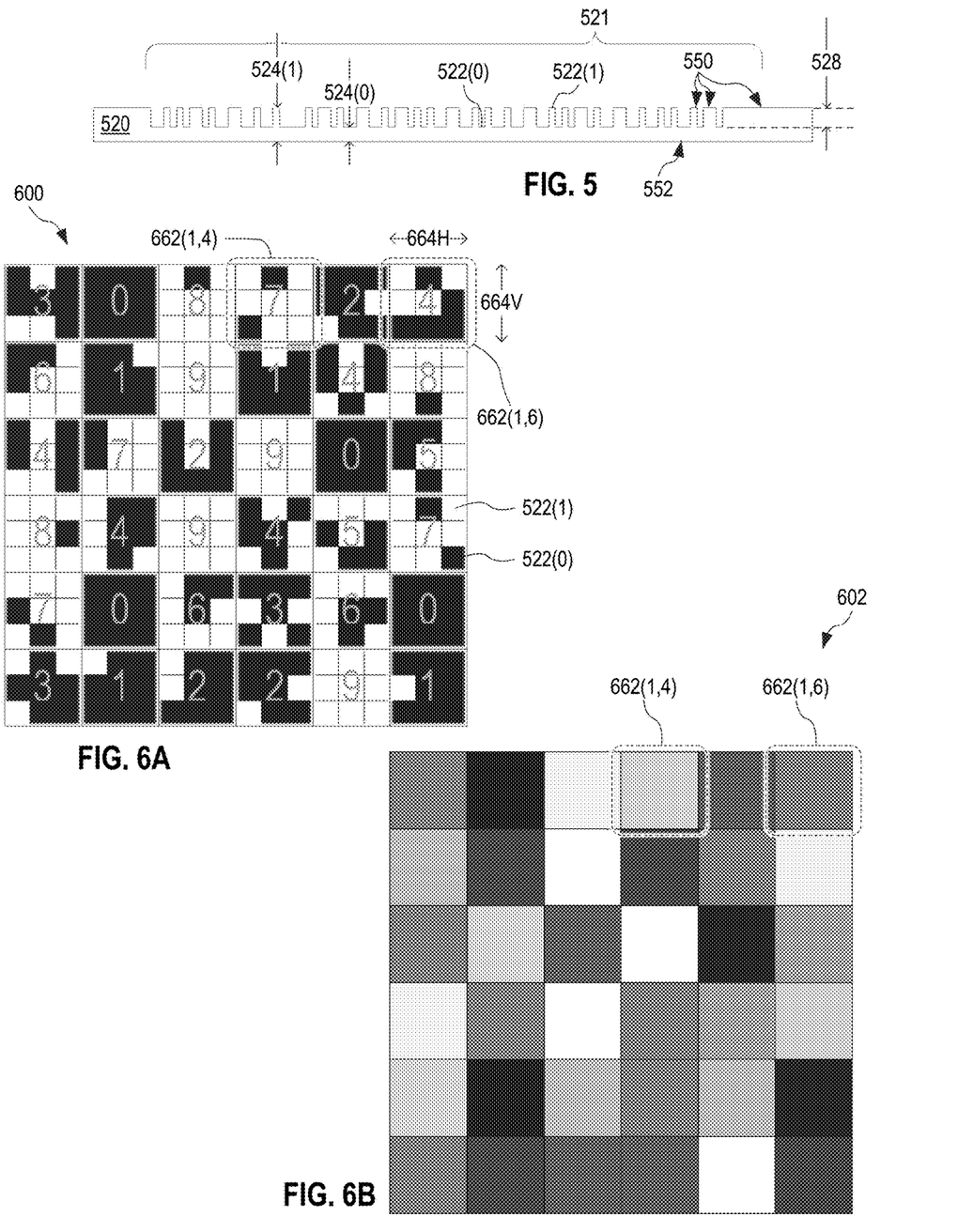
FIG. 5 illustrates a binary DOE with a binary pixelated thickness distribution that attains only two different values, according to an embodiment.
FIGS. 6A and 6B illustrate a binary, pixelated thickness distribution with super-pixels to generate a pseudo-multilevel thickness distribution, according to an embodiment.

FIG. 5 is a cross-sectional view of one binary DOE 520 with a binary pixelated thickness distribution 521 that attains only two different values. Binary DOE 520 is an embodiment of DOE 120. Pixelated thickness distribution 521 is composed of an array of pixels 522 which are embodiments of pixels 122. Pixels 522 consist of pixels 522(0) and pixels 522(1). Each pixel 522(0) has thickness 524(0), and each pixel 522(1) has thickness 524(1). Thickness 524(1) is greater than thickness 524(0).

Binary DOE 520 has opposite-facing planar surfaces 550 and 552. Surface 552 is continuous across pixelated thickness distribution 521. Surface 550 is defined by pixels 522(1). Pixels 522(1) span between surfaces 550 and 552. Surface 550 is interrupted by pixels 522(0). Pixels 522(0) are recessed from surface 550. The recess depth 528 is the difference between thicknesses 524(1) and 524(0).

In one embodiment, recess depth 528 is approximately $$d_b = \frac{\lambda}{2(n-1)}, \tag{Eq. 4}$$

which corresponds to a phase shift, between light passing through pixels 522(0) and 522(1), of π. For example, recess depth 528 may be within 20 percent of $d_b$.

In an embodiment, all pixels 522 have the same size in dimensions parallel to surface 552. However, some neighboring pixels 522 may have the same thickness 524 and therefore collectively appear larger than other pixels 522.

Although pixelated thickness distribution 521 is binary, pixels 522(0) and 522(1) may be arranged to at least partly compensate for the limitations to randomness caused by the binary nature of pixelated thickness distribution 521, as compared to the higher degree of randomness achievable with pixelated thickness distribution 421 of multilevel DOE 420.

It is understood that binary DOE 520 may have more or fewer pixels 522 than depicted in FIG. 5, for example between 30 and 1,000 pixels 522 along the cross section depicted in FIG. 5. Furthermore, (a) the array of pixels 522 may be square or non-square, e.g., round or shaped as an oblong rectangle, and (b) pixels 522 may be square or non-square, e.g., shaped as oblong rectangles.

FIGS. 6A and 6B illustrate one binary, pixelated thickness distribution with super-pixels to generate a pseudo-multilevel thickness distribution. FIG. 6A is a plan view of a pixel array 600 forming a pixelated thickness distribution. FIG. 6B is a plan view of a multilevel super-pixel array 602 formed by super-pixels of pixel array 600. FIGS. 6A and 6B are best viewed together. Pixels 522 of binary DOE 520 may be arranged accordingly to pixel array 600. It is understood that pixel array 600 may have a different number of (e.g., more) pixels and super-pixels than depicted in FIGS. 6A and 6B.

Pixel array 600 is composed of pixels 522(0) and 522(1), shown in FIG. 6A as black and white pixels, respectively. Pixel array 600 arranges pixels 522 in super-pixels 662. Each super-pixel 662 includes $N_p \times N_p$ pixels 522, where $N_p$ is an integer greater than one (for example three, as shown in FIG. 6A, or more than three). Pixel array 600 includes $N_s \times N_s$ super-pixels 662(i,j), where $N_s$ is an integer greater than one, and each of row-number i and column-number j ranges between 1 and $N_s$. Each super-pixel 662(i,j) is characterized by a respective average thickness $T_a(i,j)$, i.e., the average of thicknesses 524 of pixels 522 within super-pixel 662.

Pixel array 600 arranges pixels 522 such that the average thickness $T_a$ attains more than two different values across pixel array 600, such that super-pixels 662 form super-pixel array 602 having a multilevel thickness distribution. FIG. 6B shows each super-pixel 662 with a greyscale color that indicates its respective average thickness $T_a$. In FIG. 6A, the average thickness $T_a$ of each super-pixel 662 is indicated in the center of super-pixel 662 as a grey integer representing the level of the average thickness $T_a$. For example, super-pixel 662(1,4) has seven pixels 522(1) and two pixels 522(0) and therefore is at level "7" of the average thickness $T_a$, while super-pixel 662(1,6) has four pixels 522(1) and five pixels 522(0) and therefore is at level "4" of the average thickness $T_a$.

There are $N_p^2+1$ possible levels of the average thickness $T_a$. In one embodiment, super-pixel array 602 attains each of these $N_p^2+1$ possible levels. In the example depicted in FIGS. 6A and 6B, $N_p=3$ and super-pixel array 602 attains all possible levels 0, 1, . . . , 9 of the average thickness $T_a$. However, other embodiments of pixel array 600 may be configured such that super-pixel array 602 attains more than two but less than $N_p^2+1$ levels of the average thickness $T_a$. A high degree of randomness is desirable for speckle-suppression without diffraction. Generally, for a given value of $N_p$, the degree of randomness achievable by pixel array 600 increases with the number of the possible levels of the average thickness $T_a$. Thus, a higher degree of randomness may be achieved when super-pixel array 602 attains all of the $N_p^2+1$ possible levels.

Pixel array 600 may be viewed as having several different degrees of freedom in terms of achieving randomness including at least (a) the number of levels of the average thickness $T_a$, (b) the positioning of super-pixels 662 to randomize the pattern of average thicknesses $T_a$, and (c) the arrangement of pixels 522(0) and 522(1), within any given super-pixel 662, which may be further randomized. In regards to the arrangement of pixels 522(0) and 522(1) within individual super-pixels 662, nearby super-pixels 662 that have the same average thickness $T_a$ and include a mix of pixels 522(0) and 522(1) may be configured with different layouts of pixels 522 to add randomness. In one embodiment, any pair of nearest super-pixels 662, that include a mix of pixels 522(0) and 522(1) and are of the same average thickness $T_a$, has a different layout of pixels 522 to reduce periodicity.

In one embodiment of pixel array 600, (a) the arrangement of pixels 522 has no periodic spatial pattern with period less than 100λ and (b) the arrangement of super-pixels 662, as characterized by their respective average thicknesses $T_a$, has no periodic spatial pattern with period less than 100λ, so as to limit the diffraction angle for any first diffraction order diffraction as discussed above in reference to FIG. 3.

Without departing from the scope hereof, (a) pixel array 600 may be non-square, e.g., round or shaped as an oblong rectangle, and (b) super-pixels 662 may be non-square, e.g., shaped as oblong rectangles. For example, a horizontal side length 664H of super-pixel 662 may differ from a vertical side length 664V of super-pixel 662.

Figure 7:
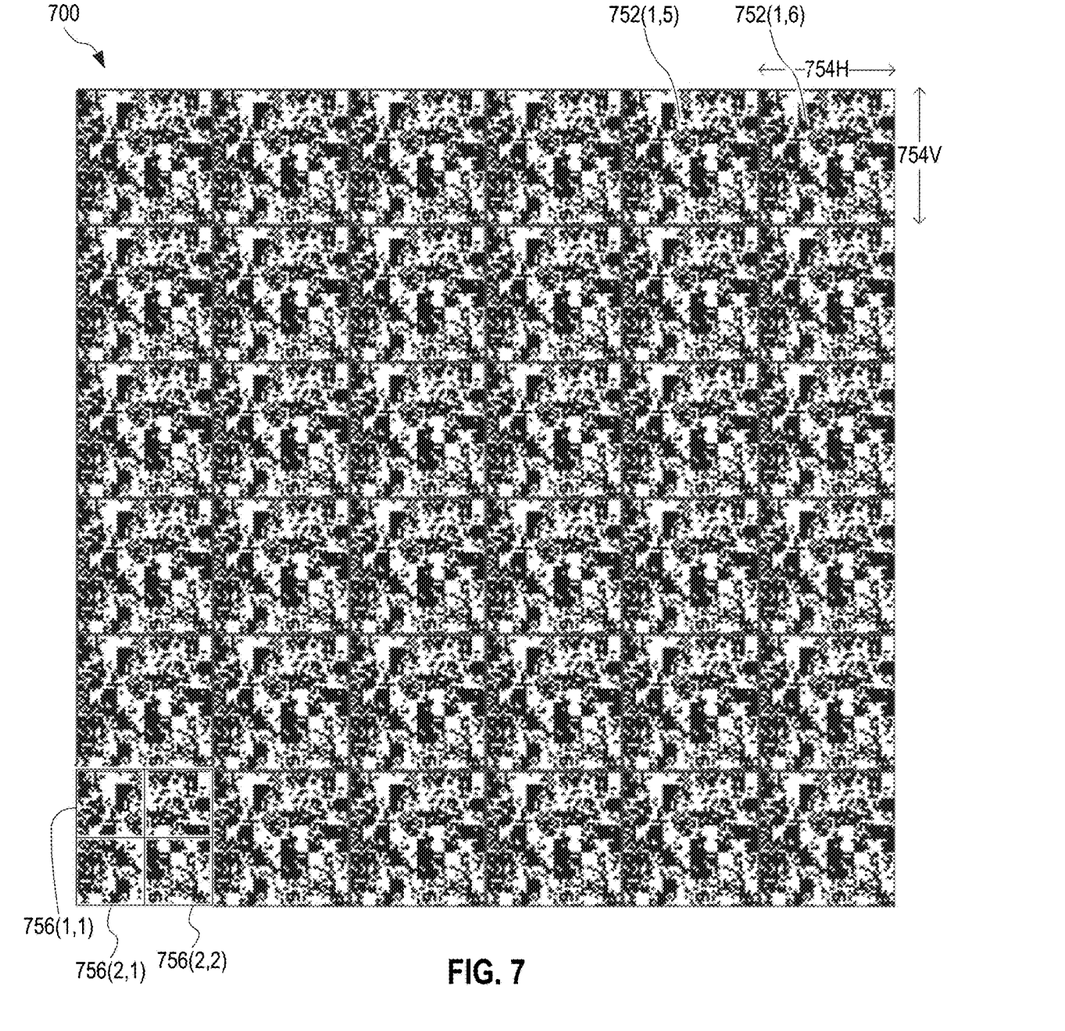
FIG. 7 illustrates a pixel array having a binary, pixelated thickness distribution with (a) super-pixels to generate a pseudo-multilevel thickness distribution and (b) a periodically repeated spatial pattern, according to an embodiment.

FIG. 7 is a plan view of one pixel array 700 having a binary, pixelated thickness distribution with (a) super-pixels to generate a pseudo-multilevel thickness distribution and (b) a periodically repeated spatial pattern. Pixel array 700 is an embodiment of pixel array 600. Pixel array 700 is an array of identical blocks 752(i,j) of super-pixels 662, wherein i and j are row- and column-numbers, respectively. (Super-pixels 662 and pixels 522 are not labeled in FIG. 7, but the smallest black dots visible in FIG. 7 are individual pixels 522(1) and the smallest white dots visible in FIG. 7 are individual pixels 522(0).) Within any one of blocks 752, neither the super-pixels 662 nor the pixels 522 exhibit a periodic spatial pattern. However, since blocks 752 are identical, the binary, pixelated thickness distribution of pixel array 700 has a periodic spatial pattern. Each block 752 is rectangular with horizontal side length 754H and vertical side length 754V. Side lengths 754H and 754V may be, but need not be, identical. To prevent distinct diffraction structure from occurring in diffused light field 190, when pixel array 700 is implemented in DOE 120, each of side lengths 754H and 754V exceeds 100λ.

In certain embodiments, block 752 is subdivided into an array of super-pixel sets 756. For example, as shown in FIG. 7, each block 752 consists of a 2×2 array of super-pixel sets 756(i,j), wherein i and j are row- and column-numbers, respectively. Within each super-pixel set 756, the binary, pixelate thickness distribution attains all of the $N_p^2+1$ possible levels of the average thickness $T_a$. However, each super-pixel set 756 within any given block 752 is different from any other super-pixel set 756 within that same block 752, such that block 752 has no periodic spatial pattern. In one embodiment, to ensure a high degree of randomness, each super-pixel set 756 is an array of at least $N_p^2 \times N_p^2$ pixels 522 and, thus, includes at least $N_p \times N_p$ super-pixels 662.

Without departing from the scope hereof, pixel array 700 may include more or fewer blocks 752 than depicted in FIG. 7, and each block 752 may include more of fewer super-pixel sets 756 than depicted in FIG. 7.

Figure 8:
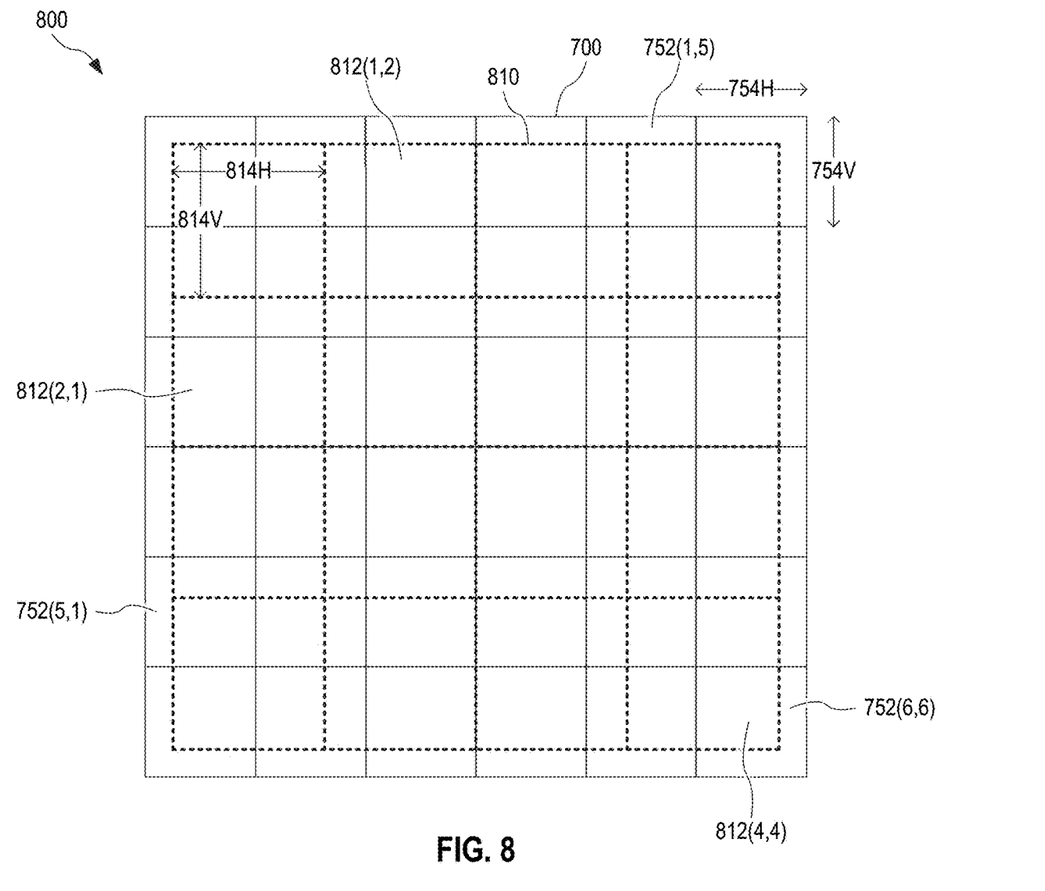
FIG. 8 illustrates the layout of a diffuser having a microlens array and a binary DOE implementing an embodiment of the pixel array of FIG. 7, according to an embodiment.

FIG. 8 illustrates the layout of one diffuser 800 having a microlens array 810 (dashed outline) and a binary DOE implementing pixel array 700 (solid outline). Diffuser 800 is an embodiment of diffuser 100, wherein the properties of pixel array 700 are matched to the size of microlenses 812 of microlens array 810 so as to provide good decoherence, and thus speckle-suppression, within the cross section of each microlens 812 while preventing distinct diffraction structure in the diffused light field.

As implemented in diffuser 800, pixel array 700 is characterized by (a) within each super-pixel set 756, the binary, pixelate thickness distribution attaining all of the $N_p^2+1$ possible levels of the average thickness $T_a$, as discussed above in reference to FIG. 7, and certain embodiments of pixel array 700. Each microlens 810 has horizontal side length 814H and vertical side length 814V. Side lengths 814H and 814V satisfy the following conditions:

$$2 \le N_p < \sqrt{\frac{CA_{min}}{2 \cdot C_p}},$$ (Eq. 5)

such that $$4C_p \le N_p^2 \cdot C_p < \frac{CA_{min}}{2},$$ (Eq. 6)

wherein $CA_{min}$ is the minimum value of horizontal side length 814H and vertical side length 814V (i.e., the minimum clear aperture of microlens 812), and $C_p$ is the side length of pixels 522 (e.g., side length 226). The lower limit $2 \le N_p$ merely states that there must be at least 2×2 pixels 522 in each super-pixel 662. The upper limit $N_p < \sqrt{CA_{min}/(2 \cdot C_p)}$ ensures that pixel array 700 has $2N_p^2 \times 2N_p^2$ super-pixels 662 for each microlens 812. This upper limit is consistent with accommodating the 2×2 array of super-pixel sets 756, discussed above in reference to FIG. 7, within the cross section of each microlens 812.

Figure 9:
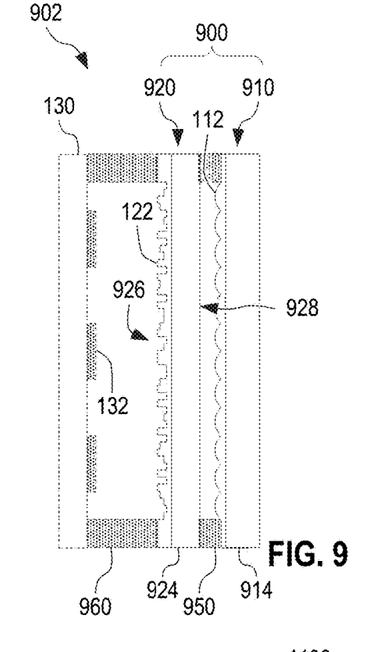
FIG. 9 illustrates a diffuser with a microlens array and a DOE facing in the same direction, according to an embodiment.

FIG. 9 illustrates one diffuser 900 with a microlens array 910 and a DOE 920 facing in the same direction. Diffuser 900, microlens array 910, and DOE 920 are embodiments of diffuser 100, microlens array 110, and DOE 120, respectively. Microlens array 910 has microlenses 112 formed on a substrate 914. DOE 920 has pixels 122 formed on or in a substrate 924. Microlenses 112 may be molded on substrate 914. Pixels 122 are, for example, molded on, etched in, or machined in substrate 924. DOE 920 has a planar side 928 facing microlens array 910, and a non-planar side 926 facing away from microlens array 910. Microlens array 910 and DOE 920 are coupled together by a spacer 950.

Diffuser 900 may be coupled with light source 130 via another spacer 960, to form an illuminator 902 (an embodiment of illuminator 102). In the example depicted in FIG. 9, non-planar surface 926 of DOE 920 and microlenses 112 face light source 130, with microlens array 910 being optically downstream from DOE 920. In an alternative embodiment of illuminator 902, non-planar surface 926 of DOE 920 and microlenses 112 face away from light source 130, with microlens array 910 being optically downstream or upstream from DOE 920.

Figure 10:
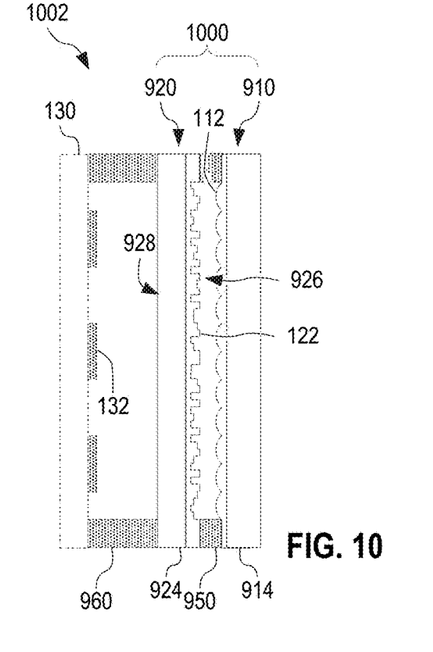
FIG. 10 illustrates a diffuser with a microlens array and a DOE facing each other, according to an embodiment.

FIG. 10 illustrates one diffuser 1000 with microlens array 910 and DOE 920 facing each other. Diffuser 1000 is an embodiment of diffuser 100. As is the case in diffuser 900, microlens array 910 and DOE 920 are coupled together by spacer 950 in diffuser 1000. Diffuser 1000 may be coupled with light source 130 via spacer 960, to form an illuminator 1002 (an embodiment of illuminator 102). In the example depicted in FIG. 10, non-planar surface 926 of DOE 920 face away from light source 130, and microlenses 112 face light source 130, with microlens array 910 being optically downstream from DOE 920. In an alternative embodiment of illuminator 1002, non-planar surface 926 of DOE 920 face light source 130, and microlenses 112 face away from light source 130, with microlens array 910 being optically upstream from DOE 920.

Figure 11:
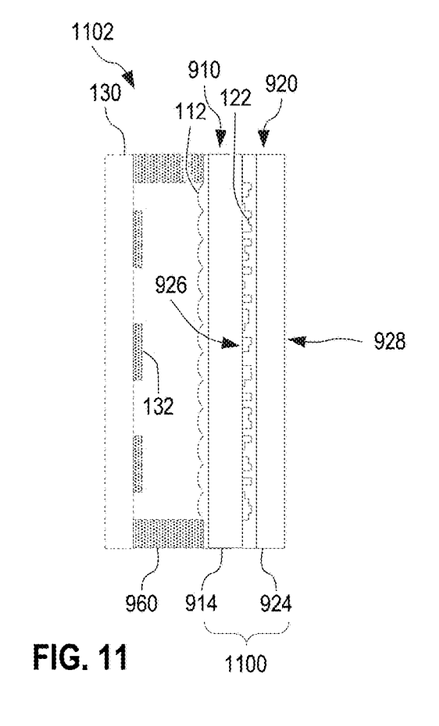
FIG. 11 illustrates a diffuser with a microlens array and a DOE bonded directly to each other, according to an embodiment.

FIG. 11 illustrates one diffuser 1100 with microlens array 910 and DOE 920 bonded directly to each other. Diffuser 1100 is an embodiment of diffuser 100. In diffuser 1100, non-planar side 926 of DOE 920 is bonded directly to the side of microlens array 910 facing away from microlenses 112.

Diffuser 1100 may be coupled with light source 130 via spacer 960, to form an illuminator 1102 (an embodiment of illuminator 102). In the example depicted in FIG. 11, non-planar surface 926 of DOE 920 and microlenses 112 face light source 130, with microlens array 910 being optically upstream from DOE 920. In an alternative embodiment of illuminator 1102, non-planar surface 926 of DOE 920 and microlenses 112 face away from light source 130, with microlens array 910 being optically downstream from DOE 920.

Figure 12:
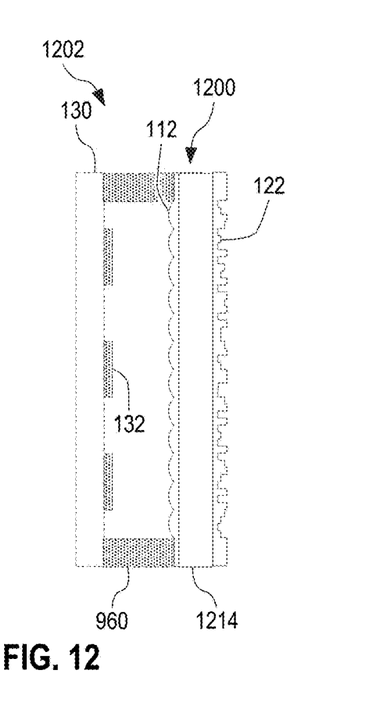
FIG. 12 illustrates a diffuser with a microlens array and a DOE on opposite sides of a common substrate, according to an embodiment.

FIG. 12 illustrates one diffuser 1200 with a microlens array and a DOE on opposite sides of a common substrate. Diffuser 1200 is an embodiment of diffuser 100. An array of microlenses 112 formed (e.g., molded) on one side of a substrate 1214 form an embodiment of microlens array 110. An array of pixels 122 formed on the opposite side of substrate 1214 form an embodiment of DOE 120. Pixels 122 may be molded on, etched in, or machined in substrate 1214.

Diffuser 1200 may be coupled with light source 130 via spacer 960, to form an illuminator 1202 (an embodiment of illuminator 102). In the example depicted in FIG. 12, microlenses 112 face light source 130 and is therefore optically upstream from the DOE formed by pixels 122. In an alternative embodiment of illuminator 1202, microlenses 112 face away from light source 130 and is therefore optically downstream from the DOE formed by pixels 122.

Each of diffusers 900, 1000, 1100, and 1200 may be manufactured at the wafer level and stacked on light source 130.

Figure 13:
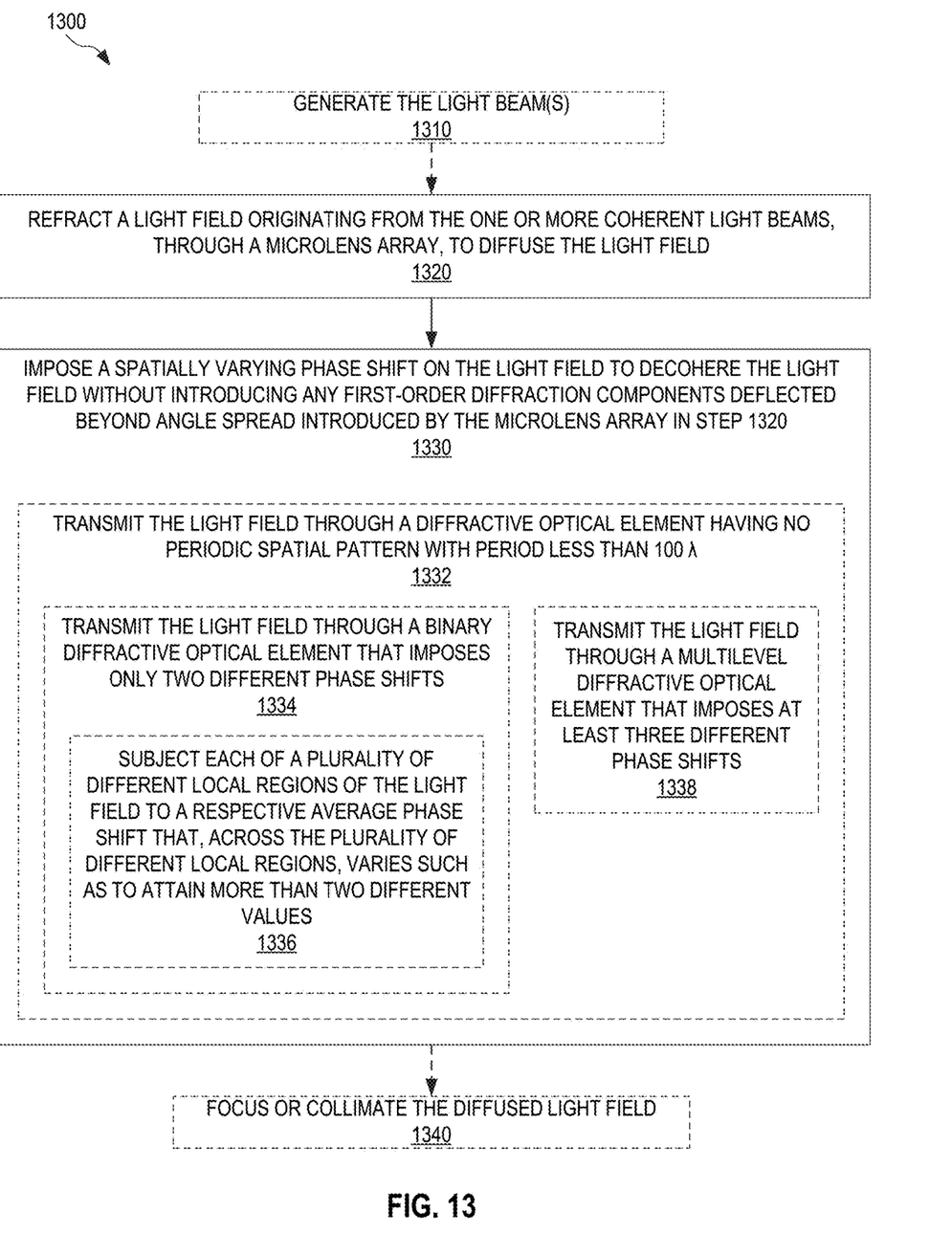
FIG. 13 illustrates a method for passively diffusing one or more coherent light beams while suppressing speckle, according to an embodiment.

FIG. 13 illustrates one method 1300 for passively diffusing one or more coherent light beams while suppressing speckle. Method 1300 is, for example, performed by diffuser 100. Method 1300 includes steps 1320 and 1330. Step 1320 refracts a light field, originating from one or more coherent light beams, through a microlens array to diffuse the light field. In one example of step 1320, microlens array 110 diffuses light field 180, as discussed above in reference to FIGS. 1 and 2. Step 1330 imposes a spatially varying phase shift on the light field to decohere the light field without introducing any first-order diffraction components deflected beyond the angle spread introduced by the microlens array in step 1320. Step 1330 thereby suppresses speckle without introducing distinct diffraction structure in the diffused light field. In one example of step 1330, DOE 120 imposes a spatially varying phase shift on light field 180 to decohere light field 180, as discussed above in reference to FIGS. 1 and 2. In this example, the pixelated thickness distribution of DOE 120 is such that the first order diffraction angle $\theta_1$ is less than the angle spread introduced by microlenses 112, as discussed above in reference to FIG. 3. Although FIG. 13 indicates that step 1320 precedes step 1330, step 1330 may instead precede step 1320.

Step 1330 may include a step 1332 of transmitting the light field through a diffractive optical element having no periodic spatial pattern with period less than 100λ, wherein λ is the wavelength of the light field. In one example of step 1332, light field 180 is transmitted through an embodiment of DOE 120 having no periodic spatial pattern with period less than 100 times the wavelength of light field 180, as discussed above in reference to FIG. 3.

In one embodiment, step 1332 includes a step 1338 of transmitting the light field through a multilevel diffractive optical element that imposes at least three different phase shifts. In one example of step 1338, light field 180 is transmitted through multilevel DOE 420, as discussed above in reference to FIGS. 4A and 4B.

In another embodiment, step 1332 includes a step 1334 of transmitting the light field through a binary diffractive optical element that imposes only two different phase shifts. In one example of step 1332, light field 180 is transmitted through binary DOE 520, as discussed above in reference to FIG. 5. Step 1334 may include a step 1336 of subjecting each of a plurality of different local regions of the light field to a respective average phase shift that, across the plurality of different local regions, varies such as to attain more than two different values. In one example of step 1336, light field 180 is transmitted through an embodiment of binary DOE 520 configured with pixel array 600, implementing super-pixels 662, as discussed above in reference to FIGS. 6A and 6B.

Method 1300 may further include one or both of steps 1310 and 1340. Step 1310 generates the light beam(s) diffused in step 1320 and decohered in step 1330. In one example of step 1310, light source 130 generates the light beam(s). Step 1340 focuses or collimates the diffused light field generated by steps 1320 and 1330. In one example of step 1340, lens 140 focuses or collimates diffused light field 190.

Combinations of Features

Features described above as well as those claimed below may be combined in various ways without departing from the scope hereof. For example, it will be appreciated that aspects of one diffuser, illuminator, or associated method described herein, may incorporate features or swap features of another diffuser, illuminator, or associated method described herein. The following examples illustrate some possible, non-limiting combinations of embodiments described above. It should be clear that many other changes and modifications may be made to the methods, products, and systems herein without departing from the spirit and scope of this invention:

(A1) One passive speckle-suppressing diffuser includes a microlens array for diffusing a light field originating from one or more coherent light beams; and a diffractive optical element mounted in series with the microlens array and having a pixelated thickness distribution, characterized by a spatial variation across the diffractive optical element, to impose a spatially varying phase shift on the light field. The pixelated thickness distribution has no periodic spatial pattern with period less than 80 micrometers, such that the spatially varying phase shift suppresses speckle of the light field while minimizing introduction of distinct diffraction structure.

(A2) In the diffuser denoted (A1), the pixelated thickness distribution may be configured to have no periodic spatial pattern with period less than 160 micrometers.

(A3) In either of diffusers denoted (A1) and (A2), the diffractive optical element may have opposite-facing first and second planar surfaces, wherein the first planar surface is continuous, and the second planar surface is (a) defined by a first set of pixels of the pixelated thickness distribution characterized by a maximum thickness spanning between the first and second planar surfaces and (b) interrupted by a second set of pixels of the pixelated thickness distribution that are recessed from the second planar surface by a non-zero depth.

(A4) In the diffuser denoted (A3), the non-zero depth may be identical for all pixels in the second set of pixels.

(A5) In either of the diffusers denoted (A3) and (A4), the second set of pixels may include a plurality of subsets of pixels, each of the subsets being recessed from the second planar surface by a different respective non-zero depth.

(A6) In any of the diffusers denoted (A3)-(A5), the microlens array and the diffractive optical element may be formed on opposite sides of a common substrate.

(A7) In any of the diffusers denoted (A3)-(A5), the microlens array may be formed on a first surface of a first substrate, and the diffractive optical element may be formed on a second surface of a second substrate, wherein the first and second surfaces face each other, and the diffuser may further include a spacer coupling the first substrate to the second substrate.

(A8) In any of the diffusers denoted (A3)-(A5), the microlens array may be formed on a first surface of a first substrate, and the diffractive optical element may be formed on a second surface of a second substrate, wherein the first and second surfaces face in same direction, and the diffuser may further include a spacer coupling the first substrate to the second substrate.

(A9) In any of the diffusers denoted (A3)-(A5), the microlens array may be formed on a first surface of a first substrate, and the diffractive optical element may be formed on a second surface of a second substrate, wherein the first and second surfaces face in same direction, and the diffractive optical element may be bonded directly to the first substrate.

(A10) In any of the diffusers denoted (A1)-(A9), the pixelated thickness distribution may be binary, such that each pixel of the pixelated thickness distribution is characterized by either a first thickness $T_1$ or a second thickness $T_2 < T_1$.

(A11) In the diffuser denoted (A10), pixels of the pixelated thickness distribution may be arranged in an array of super-pixels, wherein (a) each super-pixel consists of $N_s$ pixels, $N_s$ being an integer greater than two, (b) each super-pixel is characterized by an average thickness, and (c) the average thickness varies across the array of super-pixels and attains at least three different values.

(A12) In the diffuser denoted (A10), pixels of the pixelated thickness distribution may be arranged in an array of square super-pixels, wherein (a) each super-pixel consists of $N_p \times N_p$ pixels, $N_p$ being an integer greater than one, (b) each super-pixel is characterized by an average thickness, and (c) the average thickness varies across the array of super-pixels and attains $N_p^2 + 1$ different values.

(A13) In the diffuser denoted (A12), $N_p$ may be less than $\sqrt{CA_{min}/(2 \cdot C_p)}$, wherein $CA_{min}$ is minimum clear aperture of microlenses of the microlens array and $C_p$ is side length of the pixels.

(A14) In any of the diffusers denoted (A1)-(A8), the pixelated thickness distribution may include a plurality of pixel sets each characterized by a different respective thickness and corresponding phase shift.

(B1) One illuminator with passive speckle-suppressing diffusion includes any of the diffusers denoted (A1)-(A14) and one or more lasers for generating the one or more coherent light beams, respectively, wherein the microlens array is positioned between the diffractive optical element and the one or more lasers.

(B2) One illuminator with passive speckle-suppressing diffusion includes any of the diffusers denoted (A1)-(A14) and one or more lasers for generating the one or more coherent light beams, respectively, wherein the diffractive optical element is positioned between the microlens array and the one or more lasers.

(C1) One method for passively diffusing one or more coherent light beams while suppressing speckle includes (a) refracting a light field originating from the one or more coherent light beams, through a microlens array, to diffuse the light field, and (b) imposing a spatially varying phase shift on the light field to decohere the light field without introducing any first-order diffraction components deflected beyond angle spread introduced by the microlens array in the step of refracting.

(C2) In the method denoted (C1), the light field may have wavelength $\lambda$, and the step of imposing a spatially varying phase shift may include transmitting the light field through a diffractive optical element having no periodic spatial pattern with period less than $100\lambda$.

(C3) In either of the methods denoted (C1) and (C2), the step of refracting may be performed before the step of imposing, or the step of imposing may be performed before the step of refracting.

(C4) In any of the methods denoted (C1)-(C3), the spatially varying phase shift may attain only two different values.

(C5) In the method denoted (C4), the light field may have wavelength $\lambda$ and the step of imposing a spatially varying phase shift may include transmitting the light field through a diffractive optical element having (a) refractive index n and (b) a binary thickness distribution attaining thicknesses $T_1$ and $T_2$, wherein the difference between $T_1$ and $T_2$ is within 20 percent of $\lambda/[2(n-1)]$.

(C6) In either of the methods denoted (C4) and (C5), the step of imposing may include subjecting each of a plurality of different local regions of the light field to a respective average phase shift that, across the plurality of different local regions, varies such as to attain more than two different values.

(C7) In the method denoted (C6), the light field may have wavelength $\lambda$, and the step of subjecting may include transmitting the light field through a diffractive optical element having a binary, pixelated thickness distribution, such that each pixel of the pixelated thickness distribution is characterized by either a first thickness $T_1$ or a second thickness $T_2<T_1$, wherein (i) pixels of the binary, pixelated thickness distribution are arranged in an array of super-pixels, (ii) each super-pixel consisting of $N_s$ pixels, $N_s$ is an integer greater than two, (iii) each super-pixel is characterized by an average thickness, (iv) the average thickness varies across the array of super-pixels and attains at least three different values, and (v) spatial variation of the average thickness has no periodic spatial pattern with period less than $100\lambda$.

(C8) In any of the methods denoted (C1)-(C3), the spatially varying phase shift may attain at least three different values.

(C9) In the method denoted (C8), the light field may have wavelength $\lambda$, and the step of imposing a spatially varying phase shift may include transmitting the light field through a diffractive optical element having (a) refractive index n and (b) a pixelated thickness distribution characterized by a maximum thickness and a minimum thickness deviating from each other by a thickness difference that is at least $\lambda/[4(n-1)]$ and no greater than $\lambda/(n-1)$.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A passive speckle-suppressing diffuser, comprising:
a microlens array for diffusing a light field originating from one or more coherent light beams; and
a diffractive optical element (DOE) mounted in series with the microlens array and having a pixelated thickness distribution across a first planar surface of the DOE, characterized by a spatial variation across the diffractive optical element, to impose a spatially varying phase shift on the light field, the pixelated thickness distribution having no periodic spatial pattern with period less than 80 micrometers, such that the spatially varying phase shift suppresses speckle of the light field while minimizing introduction of distinct diffraction structure;
wherein,
(i) in a direction parallel to the first planar surface of the DOE, a length of a microlens of the microlens array is larger than a length of a pixel of the diffractive optical element
(ii) the pixelated thickness distribution is binary, such that each pixel of the pixelated thickness distribution is characterized by either a first thickness $T_1$ or a second thickness $T_2<T_1$,
(iii) pixels of the pixelated thickness distribution are arranged in an array of super-pixels, each super-pixel consisting of $N_s$ pixels, $N_s$ being an integer greater than two, each super-pixel being characterized by an average thickness, the average thicknesses of the super-pixels in the array varying across the array of super-pixels and attaining at least three different values.

2. The diffuser of claim 1, the pixelated thickness distribution having no periodic spatial pattern with period less than 160 micrometers.

3. The diffuser of claim 1, the diffractive optical element having a second planar surface opposite the first planar surface, the first planar surface being continuous, the second planar surface being (a) defined by a first set of pixels of the pixelated thickness distribution characterized by a maximum thickness spanning between the first and second planar surfaces and (b) interrupted by a second set of pixels of the pixelated thickness distribution that are recessed from the second planar surface by a non-zero depth.

4. The diffuser of claim 3, the non-zero depth being identical for all pixels in the second set of pixels.

5. The diffuser of claim 3, the second set of pixels including a plurality of subsets of pixels, each of the subsets being recessed from the second planar surface by a different respective non-zero depth.

6. The diffuser of claim 3, the microlens array and the diffractive optical element being formed on opposite sides of a common substrate.

7. The diffuser of claim 1, pixels of the pixelated thickness distribution being arranged in an array of square super-pixels, each super-pixel consisting of $N_p \times N_p$ pixels, $N_p$ being an integer greater than one, each super-pixel being characterized by an average thickness, the average thicknesses of the super-pixels in the array varying across the array of super-pixels and attaining $N_p^2+1$ different values.

8. The diffuser of claim 7, $N_p$ being less than $\sqrt{CA_{min}/(2 \cdot C_p)}$, $CA_{min}$ being minimum clear aperture of microlenses of the microlens array, $C_p$ being side length of the pixels.

9. The diffuser of claim 1, the pixelated thickness distribution including a plurality of pixel sets each characterized by a different respective thickness and corresponding phase shift.

10. An illuminator with passive speckle-suppressing diffusion, comprising:
the diffuser of claim 1; and
one or more lasers for generating the one or more coherent light beams, respectively;

wherein the microlens array is positioned between the diffractive optical element and the one or more lasers.

11. An illuminator with passive speckle-suppressing diffusion, comprising:
the diffuser of claim 1; and
one or more lasers for generating the one or more coherent light beams, respectively;
wherein the diffractive optical element is positioned between the microlens array and the one or more lasers.

12. A passive speckle-suppressing diffuser, comprising:
a microlens array for diffusing a light field originating from one or more coherent light beams; and
a diffractive optical element (DOE) mounted in series with the microlens array and having a pixelated thickness distribution across a first planar surface of the DOE, characterized by a spatial variation across the diffractive optical element, to impose a spatially varying phase shift on the light field, the pixelated thickness distribution having no periodic spatial pattern with period less than 80 micrometers, such that the spatially varying phase shift suppresses speckle of the light field while minimizing introduction of distinct diffraction structure;

wherein,
(i) in a direction parallel to the first planar surface of the DOE, a length of a microlens of the microlens array is larger than a length of a pixel of the diffractive optical element,
(ii) the pixelated thickness distribution is binary, such that each pixel of the pixelated thickness distribution is characterized by either a first thickness T1 or a second thickness T2<T1,
(iii) pixels of the pixelated thickness distribution are arranged in an array of square super-pixels, each super-pixel consisting of $N_x \times N_y$ pixels, Ny being an integer greater than one, each super-pixel being characterized by an average thickness, the average thicknesses of the super-pixels in the array varying across the array of super-pixels and attaining $N2+1$ different values, and
(iv) N, is less than $\sqrt{CA_{min}/(2 \cdot C_p)}$, $CA_{min}$ being minimum clear aperture of microlenses of the microlens array, C, being side length of the pixels.

* * * * *